(12) United States Patent
Bélanger

(10) Patent No.: US 6,543,613 B2
(45) Date of Patent: Apr. 8, 2003

(54) FISHING BOX WITH DETACHABLE CASINGS

(76) Inventor: Claude Bélanger, 1231 Fiset, Sept-Iles (Québec) (CA), G4S 1M3

( * ) Notice: Subject to any disclaimer, the term of this patent is extended or adjusted under 35 U.S.C. 154(b) by 0 days.

(21) Appl. No.: 09/827,923

(22) Filed: Apr. 9, 2001

(65) Prior Publication Data

US 2002/0020644 A1 Feb. 21, 2002

Related U.S. Application Data

(60) Provisional application No. 60/195,314, filed on Apr. 10, 2000.

(51) Int. Cl.$^7$ .............................................. B65D 85/00
(52) U.S. Cl. .................. 206/315.11; 190/11; 224/922; 220/4.27; 220/23.4
(58) Field of Search ................................ 206/315.1, 317, 206/314, 570, 575; 200/14; 43/26, 54.1; 220/4.27, 23.4, 23.86, 23.83, 505

(56) References Cited

U.S. PATENT DOCUMENTS

| | | | |
|---|---|---|---|
| 908,903 A | * | 1/1909 | Thornton .................... 43/54.1 |
| 1,084,360 A | | 1/1914 | Rahm |
| 2,097,185 A | | 10/1937 | Hall |
| 2,483,106 A | | 9/1949 | Stanley et al. |
| 2,522,322 A | | 9/1950 | Wallace |
| 3,319,744 A | | 5/1967 | Smith |
| 3,348,329 A | | 10/1967 | Seemann |
| 3,641,697 A | | 2/1972 | Heidtman et al. |
| 3,678,611 A | | 7/1972 | Files |
| 3,811,216 A | | 5/1974 | Sauey et al. |
| 3,865,166 A | | 2/1975 | Pedro |
| 3,909,092 A | * | 9/1975 | Kiernan .................... 312/235.8 |
| 3,972,144 A | | 8/1976 | Geisler |
| 4,081,061 A | | 3/1978 | Tucker |
| 4,170,801 A | | 10/1979 | Ward |
| 4,240,222 A | * | 12/1980 | Covington .................. 43/57.1 |
| D268,547 S | | 4/1983 | Puckstuhl |
| 4,500,128 A | | 2/1985 | McClure |
| 4,523,704 A | | 6/1985 | Washington |
| 4,541,539 A | | 9/1985 | Matthews |
| 4,546,877 A | | 10/1985 | Evans |
| 4,726,141 A | | 2/1988 | McBride et al. |
| D294,883 S | | 3/1988 | McMillin |
| 4,796,762 A | | 1/1989 | Law |
| 4,858,366 A | | 8/1989 | Rushton |
| 4,901,899 A | | 2/1990 | Barrett |
| 4,986,427 A | | 1/1991 | Law et al. |
| 5,004,134 A | * | 4/1991 | Barry ......................... 224/650 |
| 5,327,669 A | | 7/1994 | Lannan et al. |
| 5,347,746 A | | 9/1994 | Letson |
| 5,366,071 A | | 11/1994 | Laszlo |
| 5,425,194 A | | 6/1995 | Miller |
| 5,547,079 A | | 8/1996 | Pino |
| 5,640,795 A | * | 6/1997 | Wambolt ....................... 43/26 |
| D393,152 S | | 4/1998 | Gibson |
| D395,360 S | | 6/1998 | Schrader, Jr. |
| 5,836,103 A | * | 11/1998 | Taylor ........................... 43/26 |
| 5,890,613 A | * | 4/1999 | Williams .................... 220/23.4 |

FOREIGN PATENT DOCUMENTS

| | | |
|---|---|---|
| CA | 497518 | 11/1953 |
| CA | 1120439 | 3/1982 |

\* cited by examiner

*Primary Examiner*—Mickey Yu
*Assistant Examiner*—Jila M. Mohandesi
(74) *Attorney, Agent, or Firm*—Franco Martineau

(57) ABSTRACT

The fishing box assembly defines a longitudinal axis and includes:

a number of box compartments for storing fishing gear therein; and releasable attachments, for releasably attaching the number of box compartments to one another to form an integral fishing box assembly.

11 Claims, 5 Drawing Sheets

FISHING BOX WITH DETACHABLE CASINGS

CROSS-REFERENCE DATA

The co-pending Provisional Patent Application No. 60/195,314 filed Apr. 10, 2000 in incorporated by way of reference to the present patent application.

FIELD OF THE INVENTION

The present invention relates to fishing boxes, and more particularly to a portable fishing box with detachable casings.

BACKGROUND OF THE INVENTION

When going fishing in an outdoor environment, it is necessary to bring along fishing gear including a multitude of elements: one or more fishing rods equipped with fly reels or spinning reels, fishhooks, artificial flies, spinners, terminal tackles, lures, fish knives, disgorgers, and a landing net being among the conventional equipment. There exist fishing boxes used to carry the smaller items such as the tackles and the spinners, but the whole equipment remains cumbersome in that a number of different elements need to be manually carried.

SUMMARY OF THE INVENTION

The present invention relates to a fishing box for carrying fishing gear and defining a longitudinal axis, comprising:
 a main elongated container; and
 at least a first casing releasably attachable to said main container.

Preferably, said fishing box further comprises an elongated handle extending along a substantial portion of the length of said fishing box and allowing said fishing box to be carried by said handle approximately at the longitudinal position of the center of gravity of said fishing box notwithstanding most longitudinal weight repartitions within said fishing box.

Preferably, said handle comprises a hollow tubular body for releasable engagement therein of the shaft of a landing net.

Preferably, said fishing box further comprises a second casing releasably attachable to said main container.

Preferably, said main elongated container comprises a thicker first end portion and a thinner extension defining a single inner compartment and a shoulder on said thicker first end portion adjacent said thinner extension, said first casing being releasably attachable onto said container thinner extension and abutting against said shoulder, and said second casing being releasably attachable onto said container thinner extension coextensively with said first casing and abutting thereagainst.

Preferably, said thinner extension comprises first tracks and said first and second casings comprise second tracks complementarily engageable with said first tracks, for stable engagement of said first and second casings onto said container thinner extension.

Preferably, said container thinner extension comprises a thinner first intermediate portion integrally attached to and coextensive with said thicker first end portion, and a thinner second end portion releasably attachable with and coextensive to said intermediate portion.

Preferably, said fishing box has a uniform thickness when said first and second casings are releasably attached onto said container thinner extension, said first casing abuts against said shoulder and said second casing abuts against said first casing.

Preferably, said fishing box further comprises support legs releasably engageable onto said fishing box for supporting said fishing box spacedly over ground, wherein said fishing box defines a flat top working surface formed by said container thicker first end portion and by said first and second casings.

The present invention further relates to a fishing box assembly defining a longitudinal axis and comprising:
 a number of box compartments for storing fishing gear therein; and
 releasable attachment means, for releasably attaching said number of box compartments to one another to form an integral fishing box assembly.

Preferably, said fishing box assembly further comprises an elongated handle member longitudinally extending along a substantial portion of the length of said fishing box and allowing said fishing box to be carried by said handle approximately at the longitudinal position of the center of gravity of said fishing box notwithstanding most longitudinal weight repartitions within said fishing box.

DETAILED DESCRIPTION OF THE EMBODIMENTS

Figure 1:
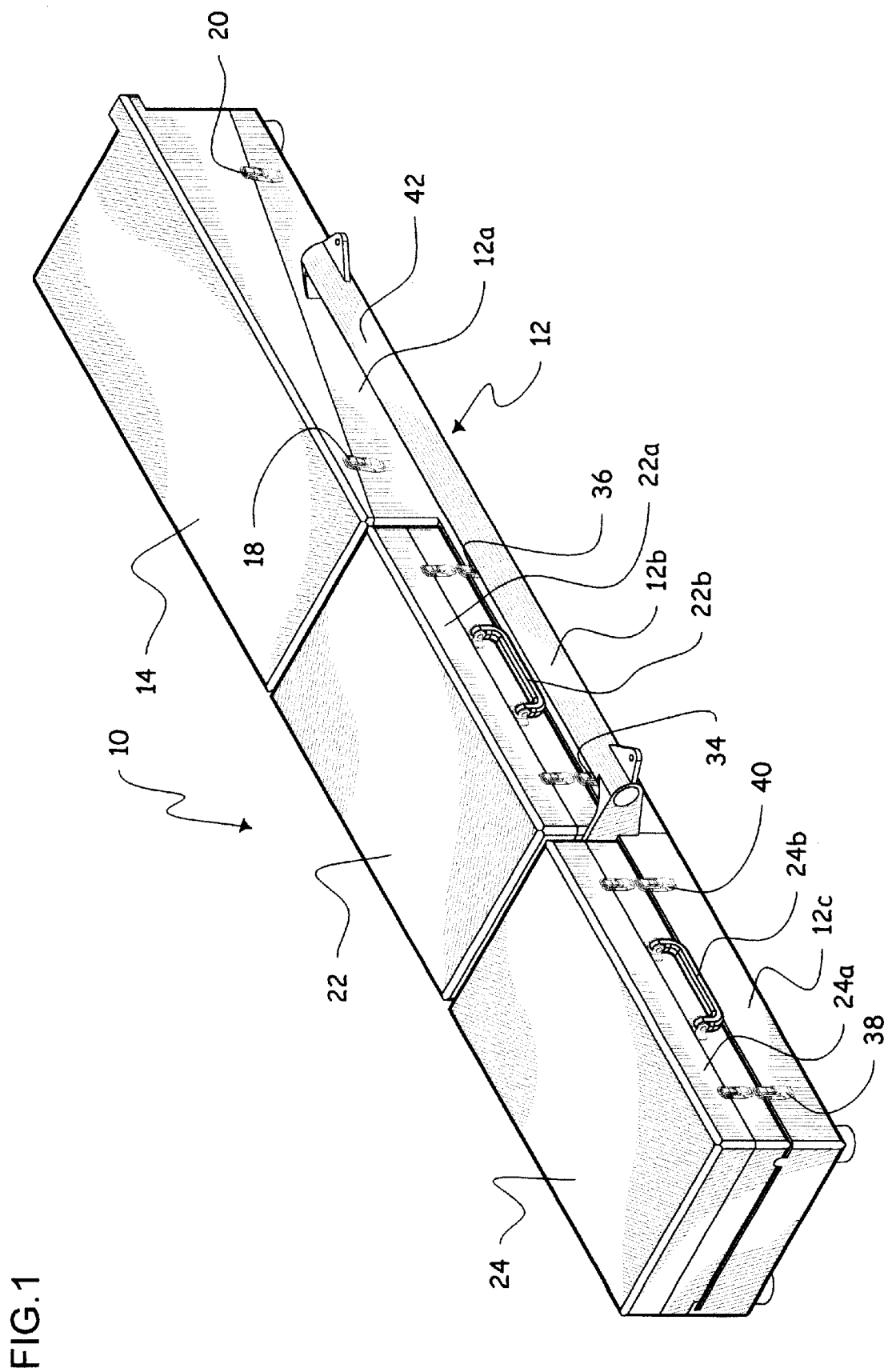
FIG. 1 is a top perspective view of the fishing box according to the present invention, in an assembled condition.
Figure 2:
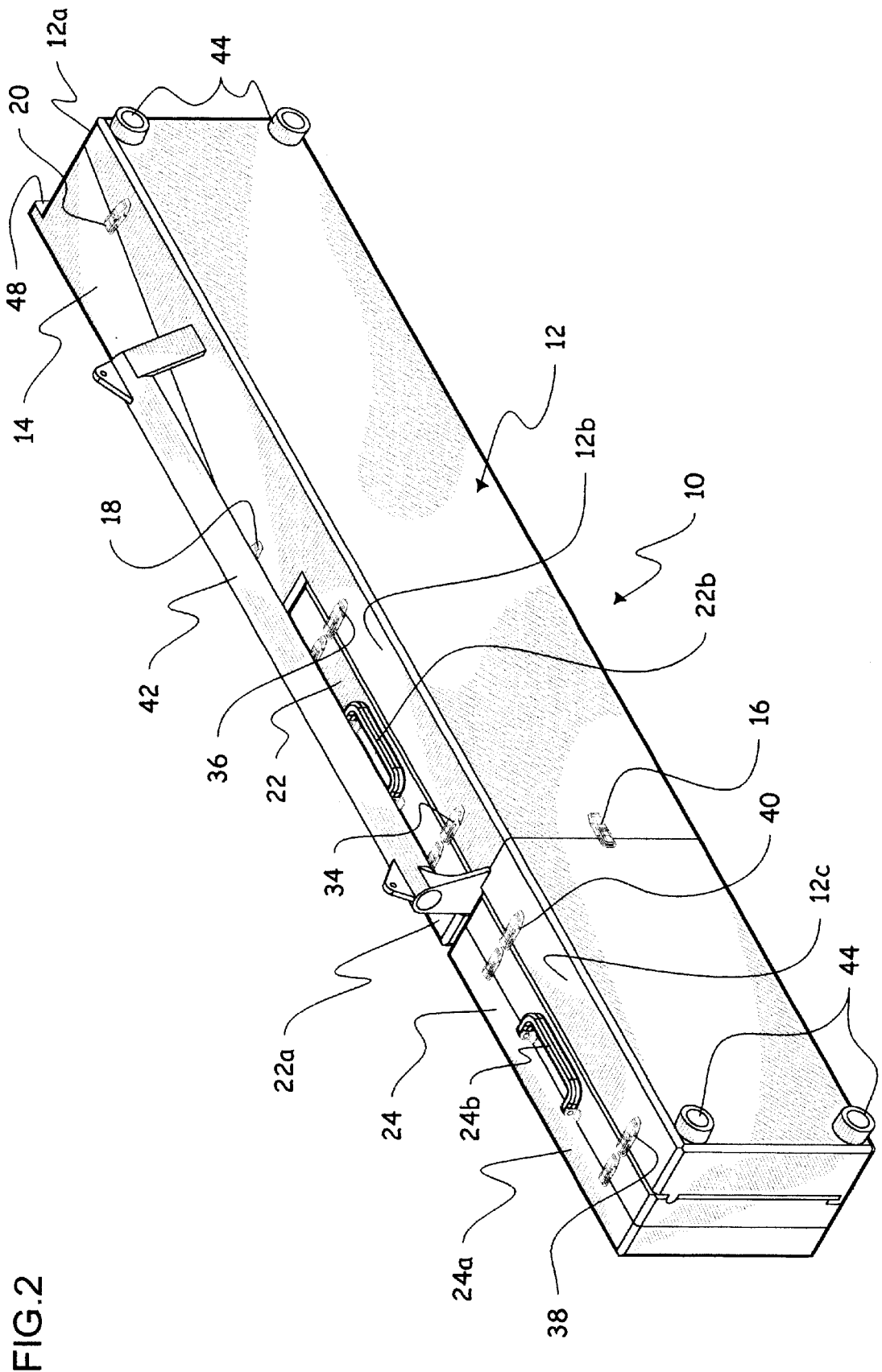
FIG. 2 is a bottom perspective view of the fishing box of FIG. 1.
Figure 3:
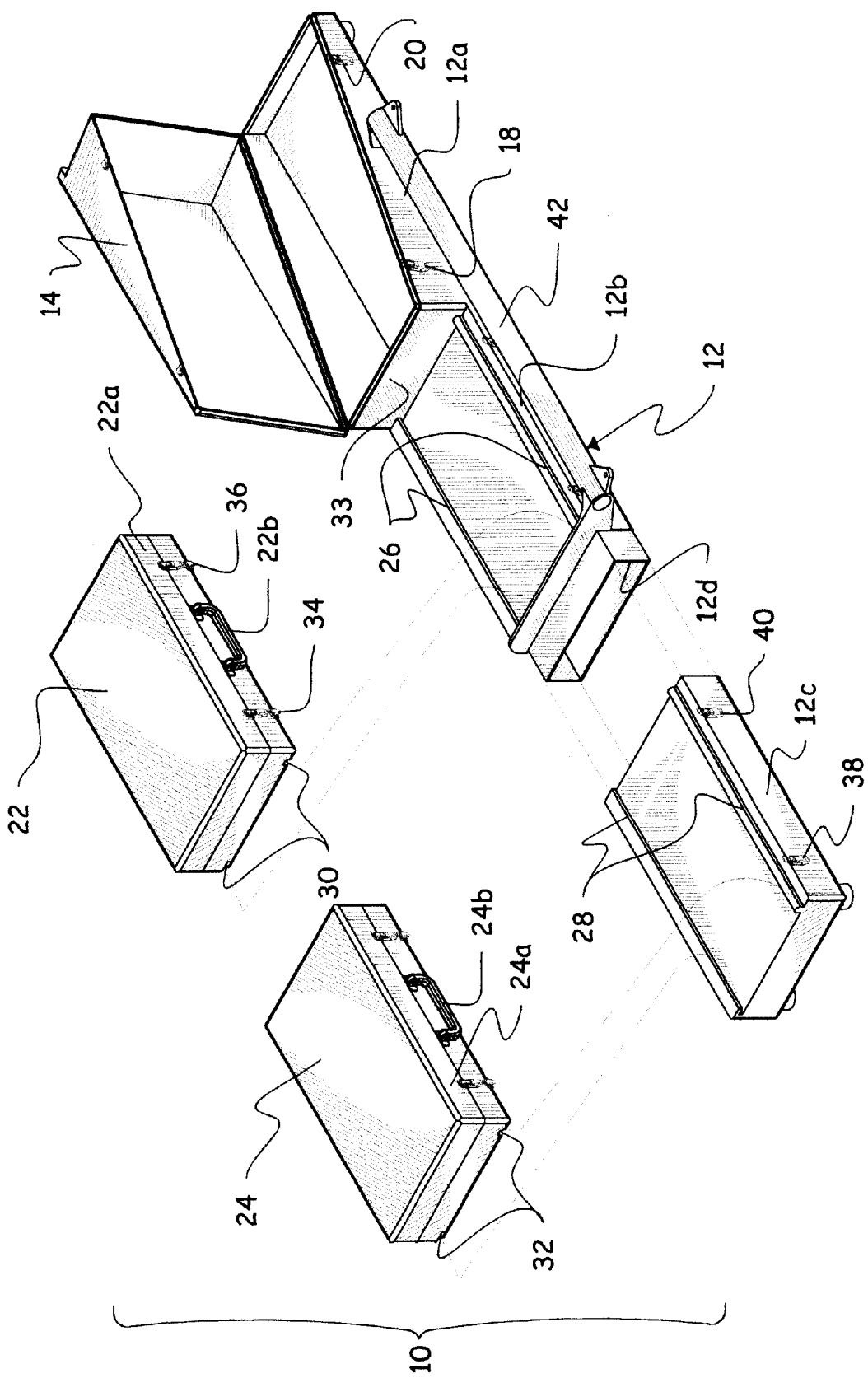
FIG. 3 is a top perspective view of the fishing box in a disassembled condition.
Figure 4:
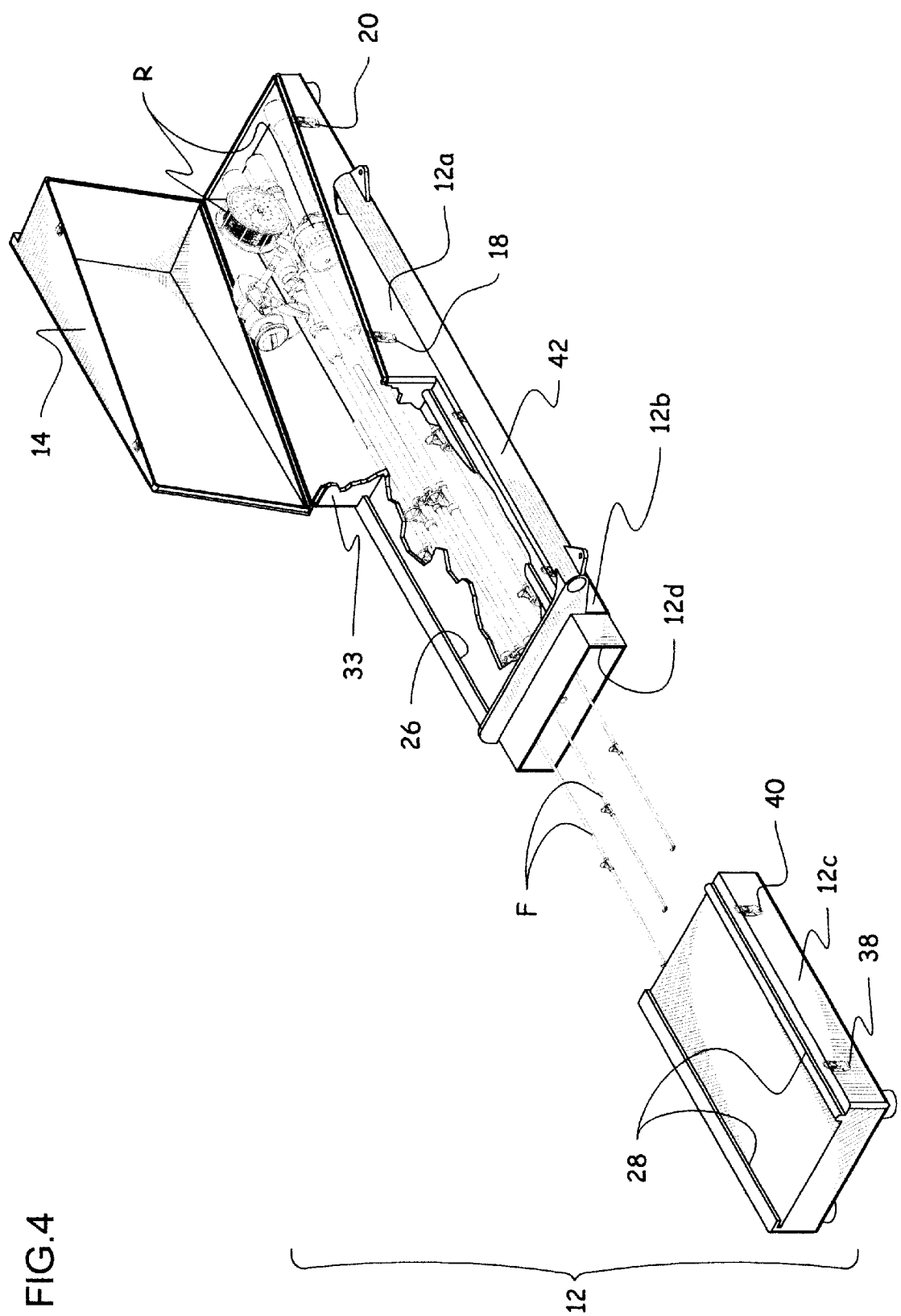
FIG. 4 is a top perspective view of the main container of the fishing box in a disassembled condition, with the top lid being opened and with portions of the wall of the main container being removed to show the fishing rods installed therein.

FIGS. 1–4 show a fishing box 10 according to the present invention, which comprises a main elongated container 12 having a thicker first end portion 12a provided with a pivotable lid 14, a thinner intermediate portion 12b and a thinner second end portion 12c, with the latter being removably engageable in an coextensive fashion with intermediate portion 12b so that portions 12a, 12b and 12c form a single elongated main compartment inside main container 12 wherein fishing rods F can be fitted (FIG. 4). The thicker first end portion 12a is destined to house the fishing rod end portions that are equipped with reels R, while the thinner extension portion formed by the coextensive intermediate and second end portions 12b, 12c is destined to house the portions of the rods extending away from the reels. A buckle 16 releasably attaches removable second end portion 12c to intermediate portion 12b. Other buckles 18, 20 are used to releasably attach lid 14 in a closed condition.

Fishing box 10 further comprises a first and a second casing 22, 24 that can be removably attached to main container 12. Indeed, the coextensive intermediate and second end portions 12b, 12c of container 12 are provided with coextensive tracks 26, 28 on their upper surface which are engageable by complementary tracks 30 and 32 respectively provided on the lower surfaces of casings 22 and 24 (FIG. 3). Container first end portion 12a forms an abutment shoulder 33 adjacent intermediate portion 12b, on which first casing 22 will abut when installed on container 12 in an attached, operative fashion. Pairs of releasable buckles 34, 36 and 38, 40 allow releasable attachment of casings 22, 24 onto main container 12. Casings 22, 24 otherwise conventionally include lids 22a, 24a sealingly closed with buckles which can be opened to reveal storage areas (not shown) in casings 22, 24, wherein smaller fishing gear may be stored, such as knives, tackles, lures, spinners, artificial flies, and so on. Casings 22, 24 are also provided with small independent handles 22b, 24b that allow each casing 22, 24 to be independently carried.

Figure 5:
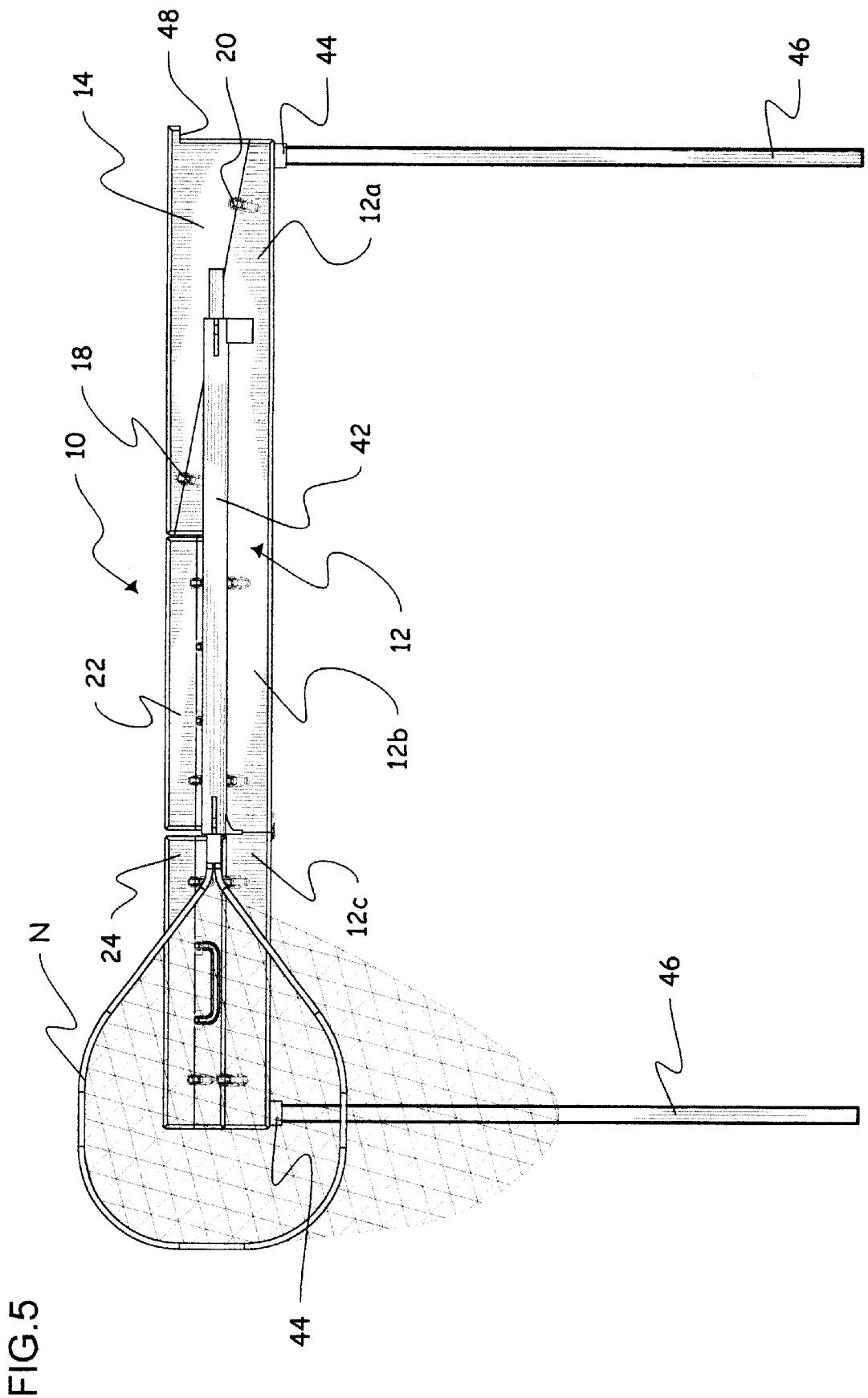
FIG. 5 is a front elevation of the fishing box mounted on support legs and with the landing net being installed in the fishing box handle.

An elongated handle 42 is integrally attached on the front surface of main container 12. It can be seen that handle 42 extends from approximately the mid-length of the container first end portion 12a to the junction between the container intermediate and second end portions 12b and 12c, being attached to intermediate portions 12b. Handle 42 could alternately extend the whole length of container first end and intermediate portions 12a, 12b. Handle 42 has a hollow tubular body in which the shaft of a landing net N can be removably engaged (FIG. 5).

Bottom support pads 44 are provided on the bottom surface of container 12, at both extremities thereof. Pads 44 are annular, and destined to be releasably engaged by complementary support legs 46 (FIG. 5) to support fishing box 10 spacedly over ground. The flat upper surface formed by the coextensive lid 14, first casing 22 and second casing 24 may thus be used as a working table then box 10 is raised on support legs 46. Legs 46 may be stored in main container 12 when they are not in use. Also, an endwisely protruding lip 48 is provided on the top surface of lid 14, for supporting a bench vice when box 10 is used as a work surface, for example for making fishing lures. Furthermore, a sheet roll of knurled surfaced material, otherwise stored in container 12, may be unrolled over the flat top working surface to shield these surfaces from damage and to provide an anti-skid surface texture for facilitating fish handling thereon.

The fishing box 10 according to the present invention thus provides means of carrying a desired amount of fishing gear. Container 12 may indeed be carried without installing thereon casings 22, 24, and either one or both casings 22, 24 may be added, as desired.

Also, since elongated handle 42 extends along a substantial portion of the length of fishing box 10, it allows fishing box 10 to be carried approximately at the longitudinal position of its center of gravity, notwithstanding whether none, one or both casings 22, 24 are installed on fishing box 10, and notwithstanding most longitudinal weight repartitions within said fishing box 10 (i.e. the expression "most longitudinal weight repartitions" include weight repartitions which would be expected inside a fishing box, and exclude very unusual weight repartitions such as 90% of the weight being located in a concentrated spot at one end of the box 10). Indeed, by moving his hand along handle 42, a person can thus hold fishing box 10 approximately at the longitudinal position of the center of gravity of fishing box 10.

It is noted that the "substantial portion" of the length of fishing box 10 is defined as the portion of fishing box 10 along which it is most likely that the longitudinal position of the center of gravity of fishing box 10 be located, considering usual weight repartitions within the fishing box and considering that the fishing box may have different weight repartitions according to the number of casings 22, 24 that are attached to container 12. That is to say, fishing box 10 is likely to have the longitudinal position of its center of gravity located at different positions depending on the following factors: (a) are the casings 22 and/or 24 attached to container 12; and (b) how is the load spread inside container 12 and eventually casings 22 and 24 if they are attached to container 12? Considering that a normal loading of fishing box 12 will see the load more or less equally longitudinally spread in each casing 22, 24 and container 12 proportionally to the available area per unit of length of each casing/container, then the presence or absence of casings 22, 24 will influence the longitudinal position of the center of gravity of box 10. If both casings 22, 24 are not installed on container 12, then the longitudinal position of the center of gravity of box 10 will probably be located at the container first end portion 12a, and more particularly probably not further away from container intermediate portion 12b than half the length of container first end portion 12a; whereas if both casings 22, 24 are installed on container 12, then the longitudinal position of the center of gravity of box 10 will probably be located somewhere along the container intermediate portion 12b. Thus, handle 42 is sized to extend along a substantial proportion of the length of box 10, which has a variable longitudinal weight repartition.

It is noted that water-tight seals are provided on all lid openings 22a, 24a, 14. Consequently, box 10 is water-tight and buoyant. Also, the inner compartments which are defined inside each casing 22, 24 can be provided with equipment shelves or racks, as known in the art. Sponge members can furthermore be provided inside container 12 to hold and protect the fishing rods F.

Although a fishing box including one container and two casings has been illustrated in the drawings and described in the present specification, it is understood that a different type of fishing box assembly including at least two box compartments (which may include containers and/or casings) and possibly more than three box compartments is considered to be within the scope of the present invention.

It is noted that the fishing box 10 could include a container extension 12c which is much shorter (not shown), and which in fact would act only as a removable cap to close the otherwise open mouth opening 12d of container intermediate portion 12b. Such a short cap extension can be used if shorter fishing rods are to be carried in container 12. In such a situation, it is understood that second casing 24 would not be used, since the short cap extension would be much too short to support casing 24. Support pads 44 would still be provided on the short cap extension, in which the support legs 46 could be inserted.

I claim:

1. A fishing box for carrying fishing gear and defining a longitudinal axis, comprising:
   a main elongated container; and
   at least a first casing releasably attachable to said main container;
   wherein said main elongated container comprises a thicker first end portion and a thinner extension defining together a single inner compartment and a shoulder on said thicker first end portion adjacent said thinner extension, said first casing being releasably attachable onto said container thinner extension and abutting against said shoulder.

2. A fishing box as defined in claim 1, further comprising an elongated handle attached to said container and extending along a substantial portion of the length of said fishing box and allowing said fishing box to be carried by said handle approximately at the longitudinal position of the center or gravity of said fishing box notwithstanding the longitudinal weight repartition within said fishing box.

3. A fishing box as defined in claim 2, wherein said handle comprises a hollow tubular body for releasable engagement therein of the shaft of a landing net.

4. A fishing box as defined in claim 1, wherein said thinner extension comprises first tracks and said first casing comprises second tracks complementarily engageable with said first tracks, for stable engagement of said first casing onto said container thinner extension.

5. A fishing box as defined in claim 1, further comprising support legs releasably engageable onto said fishing box for supporting said fishing box spacedly over ground.

6. A fishing box as defined in claim 1, further comprising a second casing releasably attachable to said main container.

7. A fishing box as defined in claim 6, wherein said second casing is releasably attachable onto said container thinner extension coextensively with said first casing and abutting thereagainst.

8. A fishing box as defined in claim 7, wherein said thinner extension comprises first tracks and said first and second casings comprise second tracks complementarily engageable with said first tracks, for stable engagement of said first and second casings onto said container thinner extension.

9. A fishing box as defined in claim 7, wherein said container thinner extension comprises a thinner first intermediate portion integrally attached to and coextensive with said thicker first end portion, and a thinner second end portion releasably attachable with and coextensive to said intermediate portion.

10. A fishing box as defined in claim 7, wherein said fishing box has a uniform thickness when said first and second casings are releasably attached onto said container thinner extension, said first casing abuts against said shoulder and said second casing abuts against said first casing.

11. A fishing box as defined in claim 7, further comprising support legs releasably engageable onto said fishing box for supporting said fishing box spacedly over ground, wherein said fishing box defines a flat top working surface formed by said container thicker first end portion and by said first and second casings.

* * * * *